US011960507B2

(12) United States Patent
Coleman et al.

(10) Patent No.: US 11,960,507 B2
(45) Date of Patent: Apr. 16, 2024

(54) HIERARCHICAL DATA

(71) Applicant: International Business Machines Corporation, Armonk, NY (US)

(72) Inventors: Andrew John Coleman, Petersfield (GB); John Anthony Reeve, Winchester (GB); Trevor Clifford Dolby, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 16/745,582

(22) Filed: Jan. 17, 2020

(65) Prior Publication Data
US 2021/0224294 A1 Jul. 22, 2021

(51) Int. Cl.
G06F 16/28 (2019.01)
G06F 16/22 (2019.01)
G06F 16/242 (2019.01)
G06F 16/2458 (2019.01)

(52) U.S. Cl.
CPC ........ *G06F 16/282* (2019.01); *G06F 16/2246* (2019.01); *G06F 16/2448* (2019.01); *G06F 16/2458* (2019.01)

(58) Field of Classification Search
CPC .............................. G06F 16/252; G06F 16/282
See application file for complete search history.

(56) References Cited

U.S. PATENT DOCUMENTS

| 8,260,784 B2 | 9/2012 | Beyer et al. |
| 9,230,040 B2 | 1/2016 | Shukla et al. |
| 9,659,045 B2 | 5/2017 | Liu et al. |
| 10,416,972 B1* | 9/2019 | Forghani ................. G06F 8/427 |
| 10,803,083 B2 | 10/2020 | Budhiraja et al. |
| 2007/0244865 A1* | 10/2007 | Gordon ................. G06F 16/252 |
| 2008/0082974 A1 | 4/2008 | Ellison |
| 2009/0112905 A1* | 4/2009 | Mukerjee .............. G06F 16/322 |
| 2014/0283081 A1 | 9/2014 | Sheridan |
| 2015/0046492 A1* | 2/2015 | Balachandran ........... G06F 8/36 |
| | | 707/772 |
| 2016/0124723 A1* | 5/2016 | Ma .......................... G06F 16/00 |
| | | 717/144 |
| 2016/0210332 A1* | 7/2016 | Milton .................... H04L 67/22 |
| 2017/0060910 A1 | 3/2017 | Budhiraja et al. |

(Continued)

FOREIGN PATENT DOCUMENTS

| CN | 101667190 A | 3/2010 |
| WO | 2019210758 A1 | 11/2019 |

OTHER PUBLICATIONS

List of IBM Patents or Patent Applications Treated as Related, Jan. 14, 2021, pp. 1-2.

(Continued)

*Primary Examiner* — Mohammad S Rostami
(74) *Attorney, Agent, or Firm* — Shackelford, Bowen, McKinley & Norton, LLP

(57) ABSTRACT

A computer-implemented method, system and computer program product for identifying ancestor objects in hierarchical data configured for processing with a query, the query having an associated abstract syntax tree. The abstract syntax tree may be processed so as to generate an augmented abstract syntax tree which includes parent identifiers configured to identify the parent nodes of the query. In this way, a need to pre-parse the data may be alleviated. Instead, the identification of a parent node of a query may be encoded into the abstract syntax tree of the query.

14 Claims, 5 Drawing Sheets

(56) References Cited

U.S. PATENT DOCUMENTS

| | | | |
|---|---|---|---|
| 2017/0060973 | A1 | 3/2017 | Liu et al. |
| 2017/0257385 | A1* | 9/2017 | Overson ............. H04L 63/1441 |
| 2018/0074792 | A1* | 3/2018 | Goergens ............ G06F 16/2282 |
| 2018/0165336 | A1* | 6/2018 | Venkateswarulu .... G06Q 10/10 |
| 2018/0232404 | A1* | 8/2018 | Bhatti .................... G06F 9/541 |
| 2018/0288468 | A1 | 10/2018 | Yamagishi et al. |
| 2018/0365201 | A1* | 12/2018 | Hunn ................... H04L 9/3239 |
| 2019/0007753 | A1 | 1/2019 | Yang et al. |
| 2019/0079974 | A1 | 3/2019 | Goergens et al. |
| 2019/0278572 | A1* | 9/2019 | Yoshida .................... G06F 8/71 |
| 2019/0294610 | A1* | 9/2019 | Naidu ................. G06F 16/2448 |
| 2020/0019722 | A1 | 1/2020 | Li et al. |
| 2020/0057671 | A1* | 2/2020 | Bailey ..................... G06F 9/505 |
| 2020/0117664 | A1* | 4/2020 | Kondiles ............. G06F 16/2246 |
| 2020/0177589 | A1* | 6/2020 | Mangalvedkar ........ H04L 67/12 |
| 2020/0192662 | A1* | 6/2020 | Hu .......................... G06F 8/427 |
| 2020/0301917 | A1* | 9/2020 | Niu ..................... G06F 16/2282 |
| 2020/0319856 | A1* | 10/2020 | Loria ....................... G06F 3/017 |
| 2021/0056107 | A1* | 2/2021 | Kondiles .............. G06F 16/244 |

OTHER PUBLICATIONS

International Search Report and Written Opinion of the International Searching Authority for International Application No. PCT/IB2021/050191 dated Apr. 15, 2021, pp. 1-7.

Chen et al., "Indexing Keys in Hierarchical Data," University of Pennsylvania ScholarlyCommons, Jan. 2001, pp. 1-22.

Pardede et al., "SQL/XML Hierarchical Query Performance Analysis in an XML-Enabled Database System," Journal of Universal Computer Science, vol. 15, No. 10, 2009, pp. 2058-2077.

Examination Report for United Kingdom Application No. GB2211979.6 dated Feb. 20, 2023, pp. 1-6.

Examination Report for Australian Patent Application No. 2021208982 dated Apr. 6, 2023, pp. 1-4.

Office Action for U.S. Appl. No. 17/128,020 dated Aug. 16, 2020, pp. 1-43.

Examination Report from The Intellectual Property Office of the United Kingdom for United Kingdom Application No. GB2211979.6 dated Jun. 14, 2023, pp. 1-5.

Office Action for U.S. Appl. No. 17/128,020 dated Sep. 21, 2023, pp. 1-32.

Examination Report for Australian Patent Application No. 202120892 dated Jan. 10, 2024, pp. 1-3.

Response to Examination Report for UK Patent Application No. 2211979.6 dated Apr. 13, 2023, pp. 1-4.

Office Action for U.S. Appl. No. 17/128,020 dated Jun. 21, 2023, pp. 1-43.

Office Action for U.S. Appl. No. 17/128,020 dated Feb. 24, 2023, pp. 1-21.

Examination Report for Australian Patent Application No. 2021208982 dated Feb. 12, 2024, pp. 1-4.

* cited by examiner

HIERARCHICAL DATA

TECHNICAL FIELD

Embodiments of the present invention relate generally to hierarchical data, and more particularly to concepts for identifying ancestor objects in hierarchical data. Embodiments of the present invention also relate to concepts for processing hierarchical data with a query according to a query language. Such concepts may be computer-implemented.

Furthermore, embodiments of the present invention also relate to a computer program product comprising computer-readable program code that enables a processor of a system, or a number of processors of a network, to implement such a method.

Additionally, embodiments of the present invention further relate to a system for identifying ancestor objects in hierarchical data configured for processing with a query according to a query language. Embodiments of the present invention further relate to a system for processing hierarchical data with a query according to a query language.

BACKGROUND

Structured data query languages, such as)(Path (an eXtensible Markup Language (XML) query language), comprise syntax that allows a user to find the 'parent' element of any other element within a data structure. This is possible because the input data (e.g., XML in the case of using)(Path) will have been specially parsed to contain fully interconnected relationship information in the parsed input structure. Thus, the query engine simply needs to traverse this parsed input structure when a parent element is requested.

The above approach relies on the data been pre-prepared to contain the relationship information. Pre-preparing the input data adds extra CPU overhead to query evaluation. Also, creating a copy of the data with the extra relationship metadata consumes significantly more memory, and has to be done for every invocation of a query.

For cases where the data is not modified to include the relationship information, for example a JavaScript® object structure that natively represents JSON (JavaScript® Object Notation) data, the query engine is not able to identify the 'parent' of an arbitrary data within the data structure (because the relationship information is not available).

SUMMARY

Embodiments of the present invention seek to provide a method for identifying ancestor objects in hierarchical data configured for processing with query according to a query language.

Embodiments of the present invention also seek to provide a method for processing hierarchical data with a query according to a query language, the query having an associated abstract syntax tree, AST.

Embodiments of the present invention further seek to provide a computer program product including computer program code for implementing a proposed method when executed by a processing unit. Embodiments of the present invention also seek to provide a processing system adapted to execute this computer program code.

Embodiments of the present invention yet further seek to provide a system for identifying ancestor objects in hierarchical data configured for processing with query according to a query language. Further, embodiments of the present invention seek to provide a system for processing hierarchical data with a query according to a query language.

According to an embodiment of the present invention, there is provided a computer-implemented method for identifying ancestor objects in hierarchical data configured for processing with query according to a query language, the query having an associated abstract syntax tree, AST. The method comprises processing the AST associated with the query to determine a parent node of the AST relating to the query. The method also comprises augmenting the AST with a parent identifier configured to identify the determined parent node so as to generate an augmented AST.

Proposed concepts may provide for a query language to determine the parent, or any higher level ancestor, for any data item within a hierarchical data structure without needing the hierarchical information (e.g., parent relationship information) to be encoded into the data itself. Rather, embodiments propose that the parse tree of the query language itself is post-processed and augmented with appropriate information.

Proposed embodiments may therefore provide the advantage that processing a query's AST may be done as part of query compilation, and thus may need only done once, whereas the evaluation of the compiled query might be undertaken numerous times. Embodiments may also have the advantage that the preprocessing of the query will not be affected by data size.

By augmenting the AST associated with query with information identifying parent nodes of a query, embodiments may eliminate a need to pre-parse the input data. Put another way, by encoding the identification of one or more parent objects into the AST of the query language, embodiments may alleviate a need to pre-prepare the input data to include relationship information.

In some embodiments, processing the AST associated with the query to determine a parent node of the AST relating to the query may comprise traversing the AST to determine a node of the AST that represents a parent node of the query. In this way, a simple process of stepping through the path(s) of the AST may be employed in order to identify a parent node in a computationally efficient manner.

The parent identifier may be configured to instruct a query processor to save a reference to the parent node. In this way, an embodiment may be configured to instruct a query processor to save a reference to a requested parent in a suitable storage mechanism so that it is available later in the query when the ancestor is actually requested.

In an embodiment, augmenting the AST with a parent identifier configured to identify the determined parent node so as to generate an augmented AST may comprise adding an ancestor attribute to the parent node of the AST. Rather than augment the data with relationship information, which may incur a high computation and/or storage cost (because every value would have to store a hidden reference back to its parent object), embodiments may pre-process the AST to add metadata to the relevant parts.

For example, adding an ancestor attribute to the parent node of the AST may comprise setting a value of the ancestor attribute to a predetermined value. For instance, the predetermined value may be based on a counter value, the counter value being incremented for each parent node that is identified. Use of a counter value may, for example, support a simple counting method for identifying corresponding parent nodes in a hierarchy with multi-level ancestry.

Some embodiments may further comprise the preceding step of generating the AST by parsing the query. Thus, it will be understood that embodiments may include generating the AST, whereas other embodiments may be configured to process a pre-existing AST (e.g., an AST that has been previously generated by a separate system/method).

Proposed embodiments may further comprise: storing the augmented AST; and associating the stored augmented AST with the hierarchical data. In this way, embodiments may be configured provide a query resource that is available for use when a query is later evaluated (potentially many times). A query may therefore only need to be processed once according to proposed concepts, whereas it may be evaluated numerous times.

The hierarchical data may comprise JSON data and the query language may then be a JSONata query language (JSON query and transformation language). Embodiments may therefore be employed in conjunction with conventional languages and object structures.

According to another embodiment of the present invention, there is provided computer-implemented method for processing hierarchical data with a query according to a query language, the query having an associated abstract syntax tree, AST. The method comprises identifying ancestor objects in hierarchical data according to a proposed embodiment. The method then also comprises evaluating the query by processing the augmented AST against the hierarchical data.

According to another embodiment of the present invention, there is provided a computer program product. The computer program product comprises a computer readable storage medium having program instructions embodied therewith, the program instructions executable by a processing unit to cause the processing unit to perform a method according to a proposed embodiment.

According to another embodiment of the present invention, there is provided a computer system comprising at least one processor and the computer program product according to an embodiment. At least one processor is adapted to execute the computer program code of said computer program product.

According to yet another embodiment of the present invention, there is provided system for identifying ancestor objects in hierarchical data configured for processing with query according to a query language, the query having an associated AST. The system comprises a processing unit configured to process the AST associated with the query to determine a parent node of the AST relating to the query. The system also comprises an augmentation component configured to augment the AST with a parent identifier configured to identify the determined parent node so as to generate an augmented AST.

According to another embodiment of the present invention, there is provided a system for processing hierarchical data with a query according to a query language, the query having an associated AST. The system comprises a system for identifying ancestor objects in hierarchical data according to a proposed embodiment. The system also comprises a processor arrangement configured to evaluate the query by processing the augmented AST against the hierarchical data.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
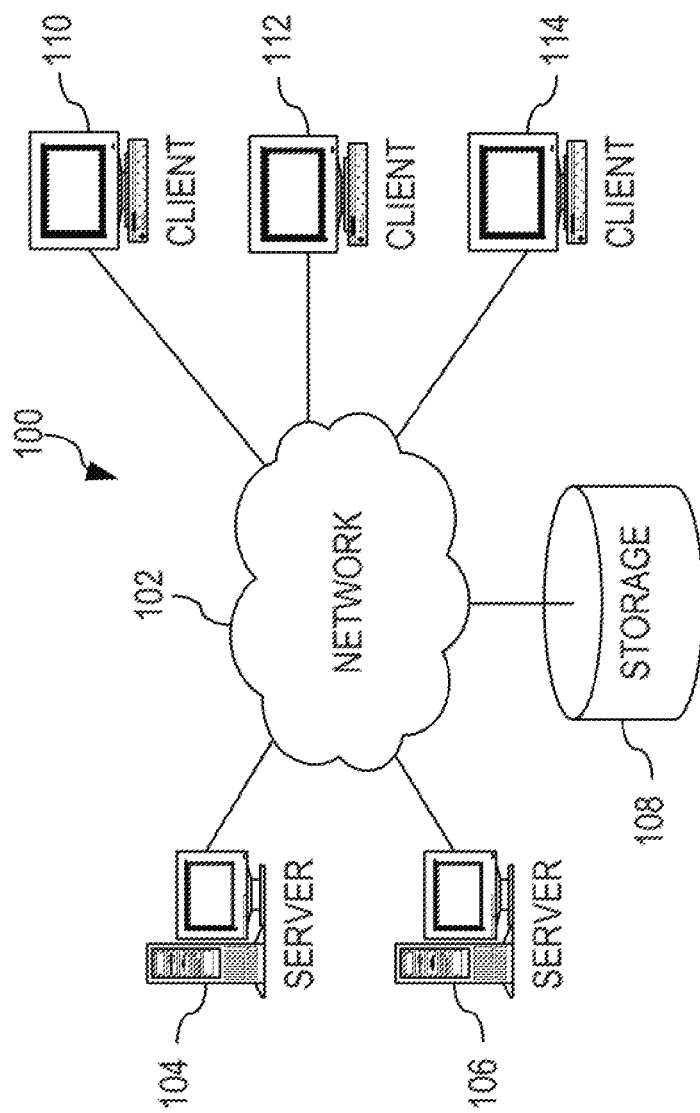
FIG. 1 depicts a pictorial representation of an example distributed system in which aspects of the illustrative embodiments may be implemented in accordance with an embodiment of the present invention.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e., may be a computer-implementable method. The various steps of the method may therefore reflect various parts of a computer program, e.g., various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention. Further, a component may be an integration flow that is executed by one or more processing units.

Concepts for identifying ancestor (e.g., parent) objects in hierarchical data configured for processing with query are proposed. Such concepts may process an AST associated the query so as to generate an augmented AST which includes parent identifiers configured to identify the parent nodes of the query. In this way, a need to pre-parse the data may be alleviated. Instead, the identification of a parent node of a query may be encoded into the AST of the query.

For instance, rather than augmenting the data with information about hierarchical relationships (which may be computationally expensive and/or require large amounts of data storage because every value would have to store a hidden reference back to its parent object), proposed embodiments may pre-process the AST of a data query to add metadata (identifying parent nodes of the query) to the relevant parts of the AST.

Reference to 'parent' should be taken to mean the object of a query that contains the property whose value we currently have a reference to in the query.

Embodiments may therefore provide concepts for finding ancestor objects in hierarchical data.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first 104 and second 106 servers are connected to the network 102 along with a storage unit 108. In addition, clients 110, 112, and 114 are also connected to the network 102. The clients 110, 112, and 114 may be edge devices, for example, personal computers, network computers, IoT devices, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

Those of ordinary skill in the art will appreciate that the hardware in FIG. 1 may vary depending on the implementation. Also, the processes of the illustrative embodiments may be applied to a multiprocessor data processing system, other than the system mentioned previously, without departing from the scope of the present invention.

Moreover, embodiments may take the form of any of a number of different data processing systems including client computing devices, server computing devices, a tablet computer, laptop computer, telephone or other communication device, a personal digital assistant (PDA), or the like. In some illustrative examples, a system according to an embodiment may be a portable computing device that is configured with flash memory to provide non-volatile memory for storing operating system files and/or user-generated data, for example. Thus, a system according to a proposed embodiment may essentially be any known or later-developed data processing system without architectural limitation.

As detailed above, proposed embodiments provide a method and system for identifying ancestor objects in hierarchical data configured for processing with query according to a query language, the query having an associated abstract syntax tree, AST.

By way of further explanation, a proposed embodiment of such a system will now be described with reference to FIG. 2.

Figure 2:
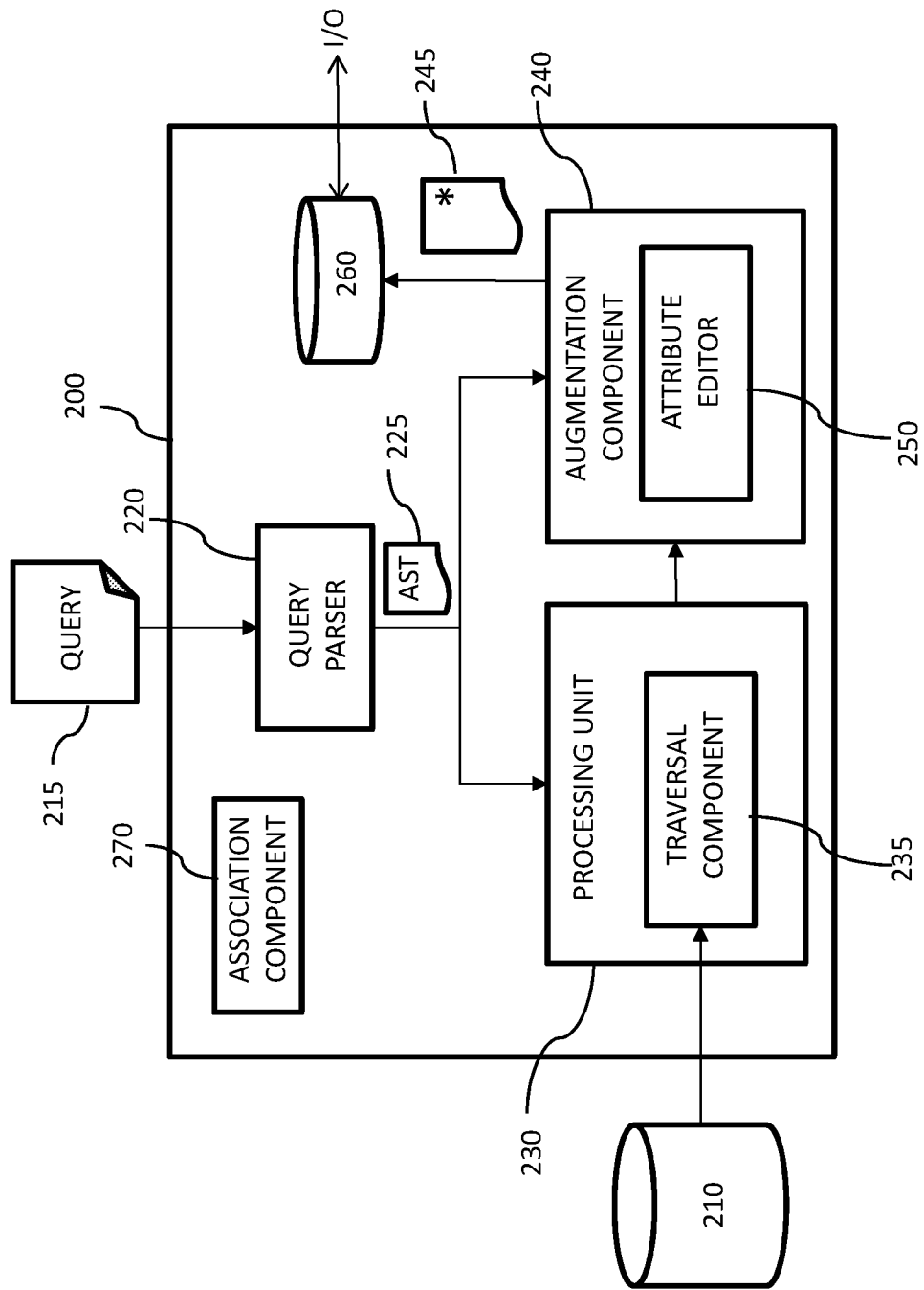
FIG. 2 is a schematic diagram of a proposed system for identifying ancestor objects in hierarchical data according to an embodiment of the present invention.

Referring to FIG. 2, there is depicted a schematic diagram of a proposed system 200 for identifying ancestor objects in hierarchical data according to an embodiment. The hierarchical data is stored in a database 210 (e.g., remote data store accessible via the Internet) and configured for processing with a query 215 according to a query language. Specifically, in this example, the hierarchical data comprises JSON (JavaScript® Object Notation) data and the query language is the JSONata query language (JSON query and transformation language).

The system 200 comprises a query parser 220 configured to generate an abstract syntax tree, AST, 225 by parsing the query 210. In this way, the system 200 is configured to generate an AST 225 that is associated with the query 210.

The system 200 also comprises a processing unit 230 configured to process the AST 225 associated with the query 210 to determine a parent node of the AST 225. Here, the processing unit 230 comprises a traversal component 235 that is configured to traverse the AST 225 to determine a node of the AST 225 that represents a parent node of the query 215.

An augmentation component 240 of the system 200 is configured to augment the AST 225 with a parent identifier that identifies the determined parent node. The parent identifier is configured to instruct a query processor to save a reference to the parent node. In this exemplary embodiment, the augmentation component 240 generates an augmented AST 245 (denoted by the "*" in FIG. 2). Specifically, the augmentation component 240 comprises an attribute editor 250 that is configured to add an ancestor attribute to the parent node of the AST 225. The attribute editor 250 sets a value of the ancestor attribute to a predetermined value, which in this example is based on a count value that is incremented for each parent node that is identified.

The system 200 further comprises: a storage component 260 configured to store the augmented AST (e.g., for subsequent access/usage via an Input/Output (I/O) interface of the system 200). The system 200 also comprises an association component 270 that is configured to associate the stored augmented AST 245 with the hierarchical data 210.

By way of further example, a query may have the following expression: Account.Order.Product.!.OrderID The above query expression will bet parsed into the following abstract syntax tree (AST):

_path_
    Account
    Order
    Product
    ! (parent)
    OrderID

A conventional expression evaluator will step through the path and apply each step to the input document. The first step selects the value associated with the 'Account' property in the input data. It then moves to the next step and, using the result of the previous step as the input (context) data, selects the value associated with the 'Order' property. This continues for each step until it gets to the '!' token which represents the 'select parent' operation. It will now have a problem because the input (context) data (i.e., the value associated with the Product property) does not contain any reference back to the 'Order' value.

Rather than augment the input data with such relationship information, which would be computationally expensive for example, the inventors propose a concept of pre-processing the AST to add additional information (e.g., metadata) for identifying parent nodes. In the above example, when the parent operator '!' is encountered, a uniquely named label may be created, one step counted back, and 'Product' step then labelled with the label. The resulting augmented AST for the example will then be as follows:

_path_
   Account
   Order
   Product (ancestor #0)
   ! (parent #0)
   OrderID where #0 is the generated label (the number being incremented for other occurrences of '!').

A query evaluator is then configured to recognize this extra information such that when it processes the 'Product' step, it first stores a reference to its input context value (which is the Order value) in a suitable storage mechanism (i.e., hash table) keyed with the label '#0'. When it gets to process the parent '!' step, the result of this step will be the value that was earlier stored against label '#0'.

It is to be appreciated that the above example is simple and may not necessarily represent a realistic need for the parent operator. A more practical example may be as follows, which for each Product, will create an object with two properties ('Name' and 'Order').

Account. Order.Product.{
   'Name': ProductName,
   'Order': !.OrderID
}

The value of the output 'Name' property will be the value of the 'ProductName' property of the input 'Product' (context) value. The value of the output 'Order' property relies on finding the parent of the current Product in order to get its 'OrderID' value.

According to the proposed concept(s), the following augmented AST is generated for the above expression:

_path_
   Account
   Order
   Product (ancestor #0)
     _object_ {
      'Name'
      _path_
        ProductName
      Order'
      _path_
        ! (parent #0)
        OrderID
     }

The complication in this example is that the parent '!' operator is the first step in its sub-path, so it is not as simple as labelling the previous step. Since the function that processes the AST is recursive, when the function returns (and unwinds the stack), if the first step is still searching for its parent, then the search is carried up the stack by adding the property 'seekingParent: label' to containing node in the AST (object constructor in this case). Once it has promoted this property to a node which is a step in a containing path, then finds the previous step to label with the 'ancestor' property.

Proposed embodiments may also be configured to cater for any level of ancestor. For example, one may consider the following query expression:

Account. Order.Product.
   'Name': ProductName,
   'Order': !.OrderID,
   'Account': !.!.AccountID
}

The expression in the preceding paragraph contains the sub-expression !.!.AccountID which is configured to select the grandparent of the Product. It is proposed to also associate a 'level' counter with the 'seekingParent' property which is then decremented for every step back it counts, but incremented if that step is a parent '!' operator. When the counter gets to zero, it has found the correct ancestor.

From the above description, it will be appreciated that proposed embodiments may be configured to provide extended functionality in a hierarchical data storage and processing system. Such functionality may be driven by leveraging a concept of pre-processing an AST associated with a query so as to generate an augmented AST which includes information for to identifying the parent nodes of the query.

By way of further explanation, a proposed embodiment of a method for identifying ancestor objects in hierarchical data will now be described with reference to FIG. 3.

Figure 3:
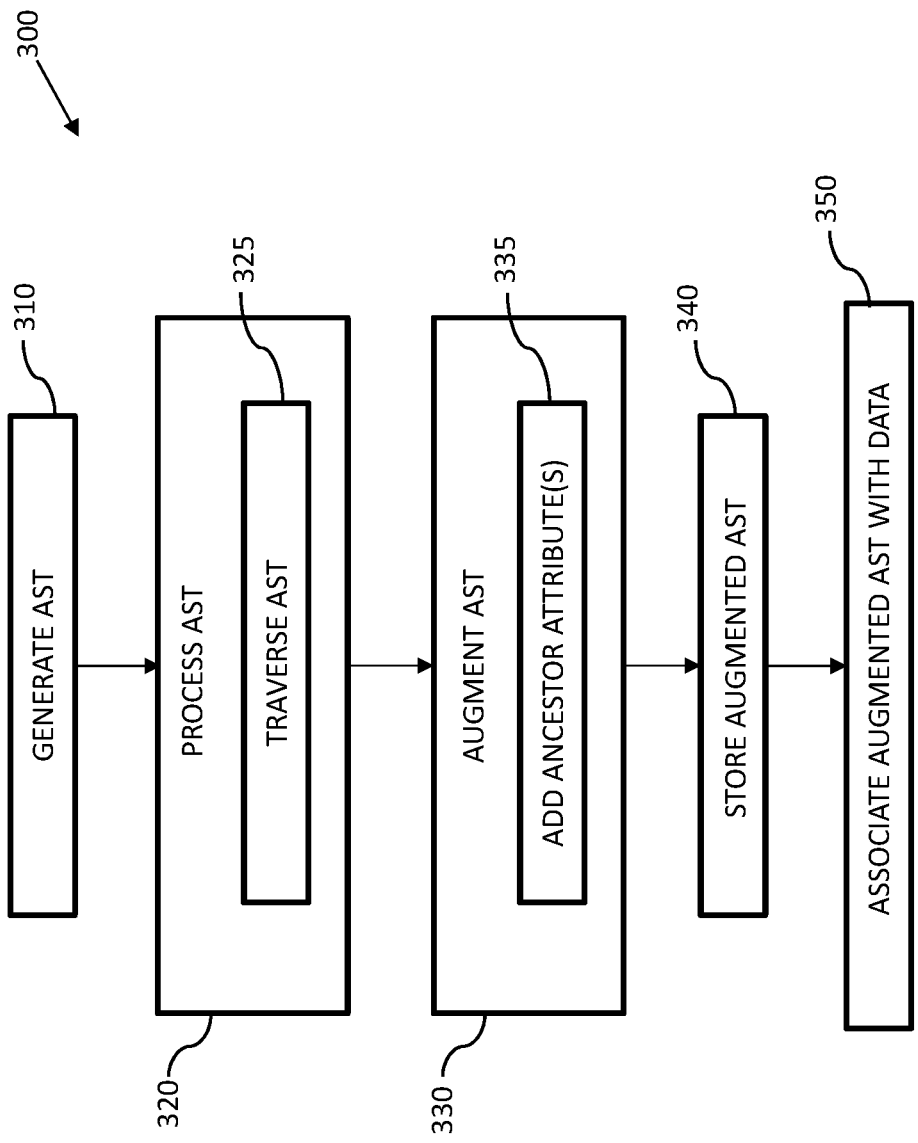
FIG. 3 is a flow diagram of a computer-implemented method for identifying ancestor objects in hierarchical data according to an embodiment of the present invention.

Referring to FIG. 3, there is shown a flow diagram of a computer-implemented method for identifying ancestor objects in hierarchical data configured for processing with a query according to a query language. In this example, the query language is the XPath query language. XPath has the ability to query parent nodes (and other nodes that precede the current context node. For this reason, XPath assumes that an XML document has been parsed by a DOM parser which creates an interconnected tree of nodes (infoset), each of which includes a link to its parent node.

The method begins with step 310 of generating an AST by parsing the query. Such generation of an AST is well-known and one of many different AST generation processes may be employed in step 310. Simply by way of example, an AST for the query may be generated using a known parser referred to as a Pratt parser. Parser generator tools may also be used that create the parser code when provided with a formal grammar for the language.

Next, in step 320, the generated AST is processed based on the query so as to determine a parent node of the AST relating to the query. Specifically, such processing to determine a parent node of the AST relating to the query comprises the step 325 of traversing the AST to determine a node of the AST that represents a parent node of the query.

The AST is then augmented with a parent identifier in step 330. Here, augmenting the AST with a parent identifier comprises the step 335 of adding an ancestor attribute to the determined parent node of the AST. This includes setting a value of the ancestor attribute to a value based on a counter value. The counter value may, for example, be incremented for each parent node that is identified, thus providing a way of discriminating between a plurality of identified parent nodes. In this way, the parent identifier may be used to instruct a query processor to save a reference to the corresponding parent node.

The augmented AST is then stored in a data storage component in step 340. Such a data storage component may be remotely located from the components/system that processed and augmented the AST (for example, via the Internet or a distributed communication network). Finally, in step 350, the stored augmented AST is associated with the hierarchical data.

Further to the above description, embodiments may also be applied to an AST representing an XPath expression. This would enable an XPath processor to query ancestor nodes in an XML document parsed by a SAX parser (SAX being a higher performance API for parsing XML documents which emits events as the document is being scanned from start to end without storing any data), while avoiding the need to store any additional structural information for the data itself. Such a technique could also be extended to apply to all of the other backward looking axes in XPath (ancestor, ancestor-or-self, parent, preceding, preceding-sibling).

By way of further explanation, a detailed description of how a proposed method may be implemented will now be provided using the JSONata query language as an example. JSONata is a JavaScript® library that is designed for querying and transforming JSON data. It has a location path syntax for navigating JSON structures similar in nature to the XPath syntax for XML data. One may consider the following example:

Input Data:
```
{
  "Account": {
    "Account Name": "Firefly",
    "Order": [
      {
        "OrderID": "order103",
        "Product": [
          {
            "ProductName": "Bowler Hat",
            "SKU": "0406654608",
            "Price": 34.45,
            "Quantity": 2
          },
          {
            "ProductName": "Trilby hat",
            "SKU": "0406634348",
            "Price": 21.67,
            "Quantity": 1
          }
        ]
      },
      {
        OrderID": "order104",
        Product": [
          {
            "ProductName": "Bowler Hat",
            "SKU": "040657863",
            "Price": 34.45,
            "Quantity": 4
          },
          {
            "ProductName": "Cloak",
            "SKU": "0406654603",
            "Price": 107.99,
            "Quantity": 1
          }
        ]
      }
    ]
  }
}
```

An exemplary JSONata query expression may then be as follows:

Account. Order.Product. {
   'Name': ProductName,
   'Order': !.OrderID
}

Here, the dot operator specifies that for each item matched by the left hand side (context), select all items that are matched by the right hand side (functional mapping operation). The '!' symbol represents the request to select the parent object of the context. In this case, the sub-path '!.OrderID' is asking for the OrderID property of the 'Order' object, which is the parent (enclosing object) of the Product context object.

The desired result of evaluating this expression on the exemplary input data above is as follows:

[
  {"Name": "Bowler Hat", "Order": "order103" },
  {"Name": "Trilby hat", "Order": "order103" },
  {"Name": "Bowler Hat", "Order": "order104" },
  {"Name": "Cloak", "Order": "order104"
]

To achieve this without changing the input data to contain parent references, the AST of the parsed query expression is traversed to identify the AST node that represents the part of the query that matches the parent object.

According to the proposed concept(s), the augmented AST for the JSONata query expression above is as follows:

```
type: path
steps:
    value: Account
    type: name
    value: Order
    type: name
    value: Product  <— AST node decorated with an 'ancestor' attribute.
    type: name
    ancestor: 0
    tuple: true
    type: unary
    value: "{"
    seekingParent: 0 <— temporary attribute used
    while traversing up the AST
    lhs
        value: Name
        type: string
        type: path
        steps:
            value: ProductName
            type: name
        value: Order
        type: string
        type: path
        steps:
            type: parent <— AST node representing the '!' token
            slot: 0
            value: OrderID
            type: name
        seekingParent: 0 <— temporary attribute
        used while traversing up the AST
```

The query evaluation engine, when processing this augmented AST against the input data will identify the AST node decorated with the 'ancestor' attribute and store its input context item (i.e., the current 'Order' value) in the tuple stream that contains the accumulated query results plus any temporary variable bindings. This stored value is then available later when the AST node representing the '!' token is processed, and looked up using the unique 'slot' number.

The algorithm used to find the parent AST node is as follows:

(i)—The parent operator is a type 'parent' step in the path array (ii) If it is the first step, then label the path as 'seekingParent'=<number> and step up the AST labelling nodes as 'seekingParent' until you are in a path. Repeat this.

(iii)—If its step index is >=1 (i.e., not the first step), then look at the previous step (iv)—Is previous step of type 'name' or 'wildcard' ?

(v)—yes: label this step parent=<number>; break (done)

(vi)—is previous step if type 'block' ?

(vii)—yes: look at last expression in block—repeat from beginning (viii)—otherwise throw error—can't determine parent From the above description, it will be appreciated that the embodiment of FIG. 3 may be leveraged for the purpose of processing hierarchical data with a query. By way of example, a proposed embodiment of a processing hierarchical data with a query according to a query language will now be described with reference to FIG. 4.

Figure 4:
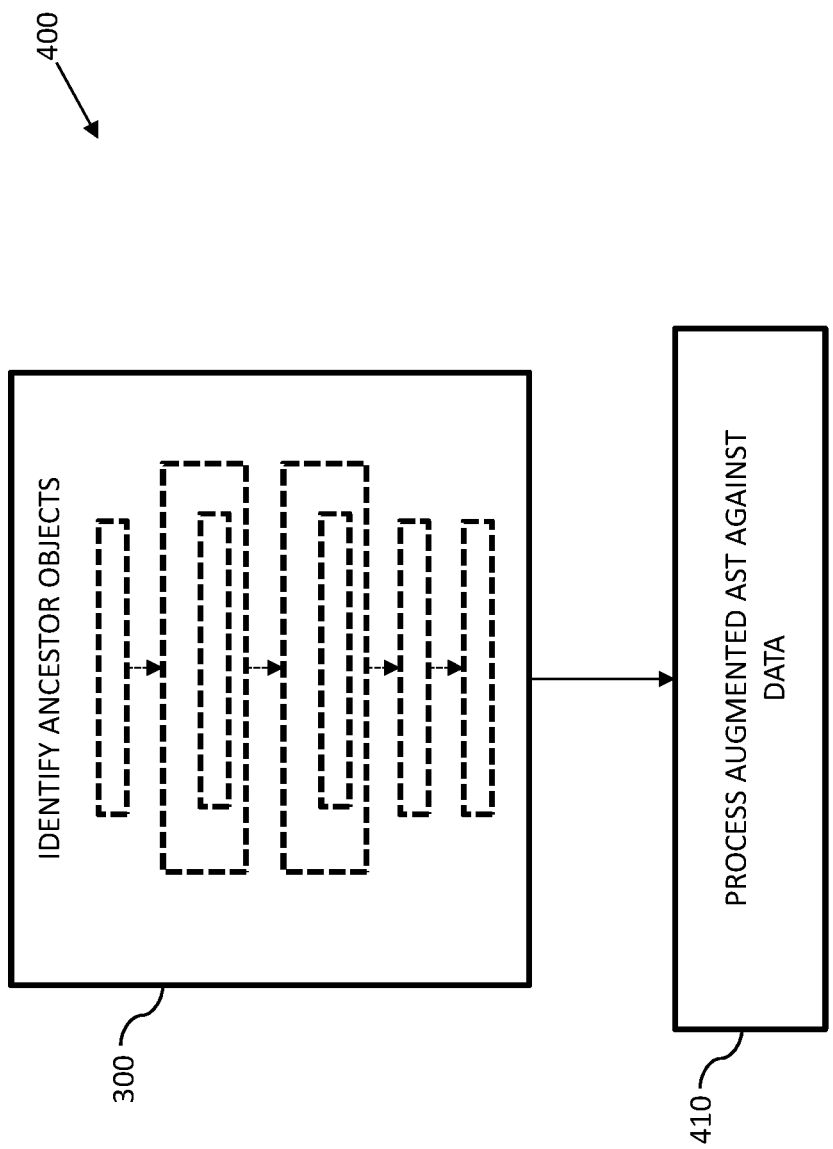
FIG. 4 is a flow diagram of a computer-implemented method for processing hierarchical data with a query according to an embodiment of the present invention.

Referring to FIG. 4, there is shown a flow diagram of a computer-implemented method 400 for processing hierarchical data with a query according to a query language. The method 400 comprises firstly executing the method 300 of identifying ancestor objects in hierarchical data according to the embodiment of FIG. 3. Then, in step 410, the query is evaluated by processing the augmented AST against the hierarchical data.

Figure 5:
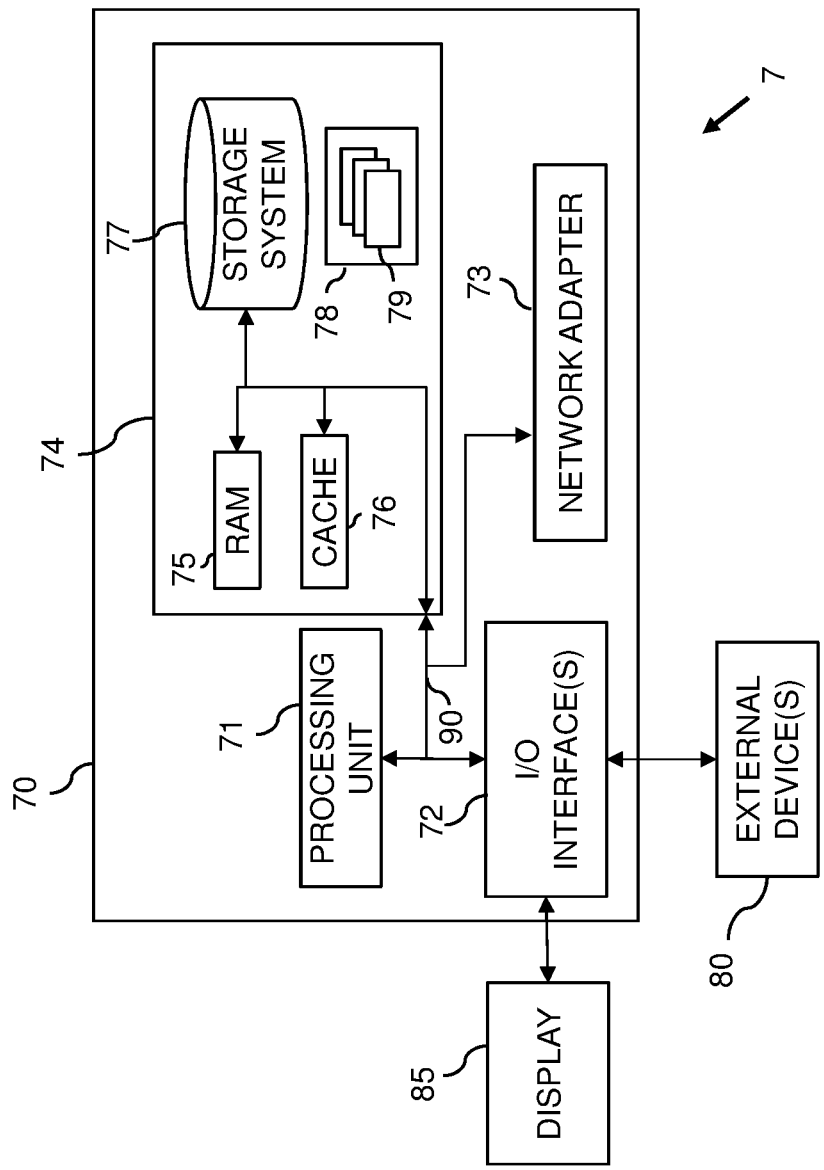
FIG. 5 illustrates a system according to another embodiment of the present invention.

Embodiments may comprise a computer system 70, which may form part of a networked system 7 illustrated in FIG. 5. For instance, an augmentation component according to an embodiment may be implemented in the computer system 70 (e.g., as a processing unit 71). The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the Input/Output (I/O) interface 72 perform a method for a middleware system of a pub/sub messaging system according to a proposed embodiment. Program/utility 78, having a set (at least one) of program modules 79, may be stored in memory 74. Program modules 79 generally carry out the functions and/or methodologies of proposed embodiments for pub/sub messaging systems.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g., to communicate determined optimal values of DFWF to edge devices of a distributed network).

In the context of the present application, where embodiments of the present invention constitute a method, it should be understood that such a method is a process for execution by a computer, i.e., is a computer-implementable method. The steps of the method therefore reflect various parts of a computer program, e.g., parts of one or more algorithms.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for identifying ancestor objects in hierarchical data stored in a database configured for processing with a query according to a query language, the query having an associated abstract syntax tree, AST, the computer program product comprising one or more computer readable storage mediums having program code embodied therewith, the program code comprising the programming instructions for:

processing, by a processing unit of a computing device, the AST associated with the query to determine a parent node of the AST relating to the query; and augmenting, by an augmentation component of the computing device, the AST with metadata containing a parent identifier configured to identify the determined parent node of the query so as to generate an augmented AST thereby eliminating a need to pre-parse input data, wherein the augmenting of the AST with the parent identifier configured to identify the determined parent node so as to generate the augmented AST comprises the programming instructions for:

adding an ancestor attribute to the parent node of the AST, wherein the adding of the ancestor attribute to the parent node of the AST comprises the programming instructions for:

setting a value of the ancestor attribute to a predetermined value, wherein the predetermined value is based on a counter value, the counter value being incremented for each parent node that is identified.

2. The computer program product as recited in claim 1, wherein the processing of the AST associated with the query to determine the parent node of the AST relating to the query comprises the programming instructions for:

traversing the AST to determine a node of the AST that represents a parent node of the query.

3. The computer program product as recited in claim 1, wherein the parent identifier is configured to instruct a query processor to save a reference to the parent node.

4. The computer program product as recited in claim 1, wherein the program code further comprises the programming instructions for:

generating the abstract syntax tree by parsing the query.

5. The computer program product as recited in claim 1, wherein the program code further comprises the programming instructions for:

storing the augmented AST; and associating the stored augmented AST with the hierarchical data.

6. The computer program product as recited in claim 1, wherein the hierarchical data comprises JSON data, wherein the query language is JSONata query language.

7. The computer program product as recited in claim 1, wherein the program code further comprises the programming instructions for:

creating a uniquely named label upon encountering an operator in the AST.

8. A system, comprising:

a memory for storing a computer program for identifying ancestor objects in hierarchical data stored in a database configured for processing with a query according to a query language, the query having an associated abstract syntax tree, AST; and a processor connected to the memory, wherein the processor is configured to execute the program instructions of the computer program comprising:

processing, by a processing unit of the system, the AST associated with the query to determine a parent node of the AST relating to the query; and augmenting, by an augmentation component of the system, the AST with metadata containing a parent identifier configured to identify the determined parent node of the query so as to generate an augmented AST thereby eliminating a need to pre-parse input data, wherein the augmenting of the AST with the parent identifier configured to identify the determined parent node so as to generate the augmented AST comprises:

adding an ancestor attribute to the parent node of the AST, wherein the adding of the ancestor attribute to the parent node of the AST comprises:

setting a value of the ancestor attribute to a predetermined value, wherein the predetermined value is based on a counter value, the counter value being incremented for each parent node that is identified.

9. The system as recited in claim 8, wherein the processing of the AST associated with the query to determine the parent node of the AST relating to the query comprises:

traversing the AST to determine a node of the AST that represents a parent node of the query.

10. The system as recited in claim 8, wherein the parent identifier is configured to instruct a query processor to save a reference to the parent node.

11. The system as recited in claim 8, wherein the program instructions of the computer program further comprise:

generating the abstract syntax tree by parsing the query.

12. The system as recited in claim 8, wherein the program instructions of the computer program further comprise:

storing the augmented AST; and associating the stored augmented AST with the hierarchical data.

13. The system as recited in claim 8, wherein the hierarchical data comprises JSON data, wherein the query language is JSONata query language.

14. The system as recited in claim 8, wherein the program instructions of the computer program further comprise:

creating a uniquely named label upon encountering an operator in the AST.

* * * * *